US008965855B1

(12) United States Patent
Phansalkar (10) Patent No.: US 8,965,855 B1
(45) Date of Patent: Feb. 24, 2015

(54) SYSTEMS AND METHODS FOR HOTSPOT MITIGATION IN OBJECT-BASED FILE SYSTEMS

(75) Inventor: Amit Phansalkar, Pune (IN)

(73) Assignee: Symantec Corporation, Mountain View, CA (US)

( * ) Notice: Subject to any disclaimer, the term of this patent is extended or adjusted under 35 U.S.C. 154(b) by 628 days.

(21) Appl. No.: 12/857,018

(22) Filed: Aug. 16, 2010

(51) Int. Cl.
*G06F 17/30* (2006.01)

(52) U.S. Cl.
USPC .......................................... 707/693

(58) Field of Classification Search
CPC .................... G06F 17/30153; G06F 17/30132
See application file for complete search history.

(56) References Cited

U.S. PATENT DOCUMENTS

| 2002/0107958 | A1* | 8/2002 | Faraldo, II | 709/224 |
| 2003/0182510 | A1* | 9/2003 | Mitra et al. | 711/122 |
| 2004/0044731 | A1* | 3/2004 | Chen et al. | 709/203 |

OTHER PUBLICATIONS

Kaiser et al., Adaptive Distributed Caching. Congress on Evolutionary Computation (2002).*
Feng Wang et al.; OBFS: A File System for Object-Based Storage Devices; Storage System Research Center; University of California, Apr. 2004.

* cited by examiner

*Primary Examiner* — Syed Hasan
(74) *Attorney, Agent, or Firm* — ALG Intellectual Property, LLC (57) ABSTRACT

A computer-implemented method for hotspot mitigation in object-based file systems may include 1) identifying a storage system including a plurality of storage devices, 2) identifying an object stored on a storage device within the plurality of storage devices, 3) identifying a level of demand to access the object, 4) creating, based at least in part on the level of demand, at least one sparse object to represent the object on at least one alternate storage device in the plurality of storage devices, and 5) fulfilling at least one read attempt to read from the object via the sparse object. Various other methods, systems, and computer-readable media are also disclosed.

20 Claims, 6 Drawing Sheets

SYSTEMS AND METHODS FOR HOTSPOT MITIGATION IN OBJECT-BASED FILE SYSTEMS

BACKGROUND

In the digital age, organizations may store, manage, and access ever increasing volumes of data. Some organizations may use object-based storage systems for improved scalability and performance in data storage. Object-based storage systems may stripe file data across one or more objects that may be stored in various locations in a storage cluster.

Unfortunately, on occasion a storage device within a storage cluster may become a "hotspot" (i.e., one or more objects on the storage device may be in high demand). For example, certain applications (such as media applications) may use large files that are written to infrequently but read from by multiple clients. While some algorithms used to distribute the objects across the storage cluster may tend to result in fewer hotspots, in practice any given distribution may result in a hotspot. Unfortunately, attempts to migrate objects responsible for such hotspots to different storage devices may simply result in the migration of hotspots or in the later creation of hotspots. Ultimately, migrating objects may consume resources without providing a stable, load-balanced object placement. Accordingly, the instant disclosure identifies a need for systems and methods for hotspot mitigation in object-based file systems.

SUMMARY

As will be described in greater detail below, the instant disclosure generally relates to systems and methods for hotspot mitigation in object-based file systems. In one example, the systems described herein may accomplish such a task by 1) identifying a storage system including a plurality of storage devices, 2) identifying an object stored on a storage device within the plurality of storage devices, 3) identifying a level of demand to access the object, 4) creating, based at least in part on the level of demand, at least one sparse object to represent the object on at least one alternate storage device in the plurality of storage devices, and 5) fulfilling at least one read attempt to read from the object via the sparse object.

In some examples, the systems described herein may identify the object stored on the storage device by 1) identifying the storage device based at least in part on an indicator of load on the storage device (e.g., locating a hotspot) and then 2) identifying a portion of the load on the storage device that relates to the object. In one example, the storage system may represent an object-based storage system that is connected to a plurality of clients.

The systems described herein may identify the level of demand to access the object using a variety of information, including 1) how many clients are attempting to read from the object, 2) how many clients are projected to attempt to read from the object, 3) the load on the storage device, and/or 4) an indicator of performance of the storage device.

In one example, the systems described herein may create the sparse object by generating a map that locates the object at a location of the sparse object. In this example, the map may include a result of a distribution function for placing data within the storage system. Once the systems described herein have generated the map, these systems may fulfill at least one attempt to read from the object via the sparse object by using the map.

In some examples, the systems described herein may fulfill the read attempt via the sparse object by fetching data corresponding to the object and populating the sparse object with the data. Once the sparse object is populated, subsequent read attempts may simply read from the sparse object. After the level of demand to access the object has reduced, the systems described herein may deprecate the sparse object.

As will be explained in detail below, the systems and methods described herein may dynamically create sparse objects in an attempt to mitigate hotspots. Furthermore, by using deterministically generated placement maps for sparse objects, these systems and methods may dynamically vary the number of sparse objects based on input/output load and quickly diffuse the load on files at identified hotspots within minimal initial overhead. Additionally, the systems and methods described herein may easily recover from failures simply by failing back to the original object or using a new map pointing to a new sparse object.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
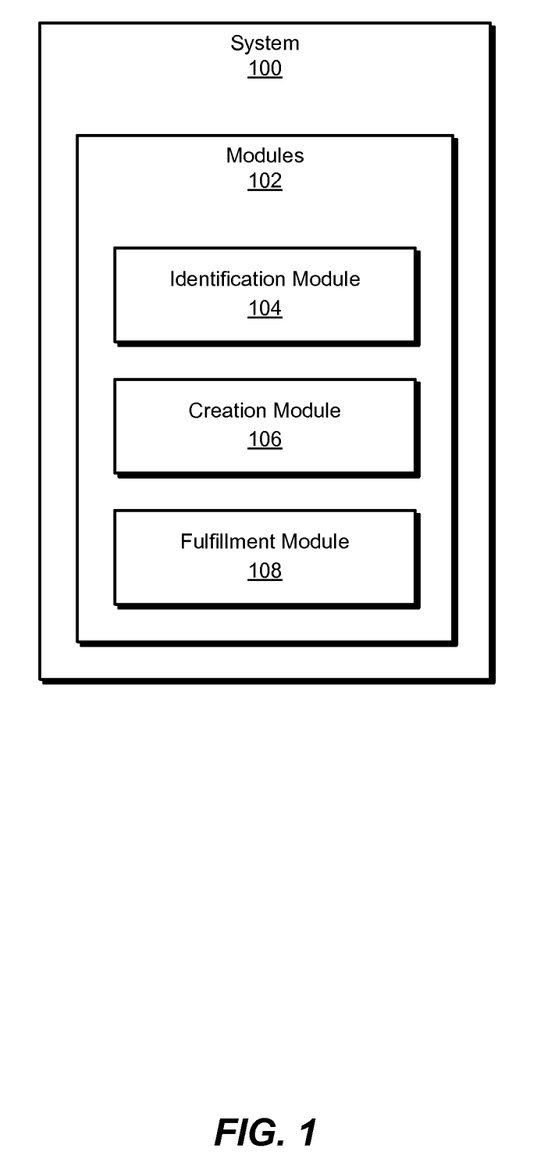
FIG. 1 is a block diagram of an exemplary system for hotspot mitigation in object-based file systems.
Figure 2:
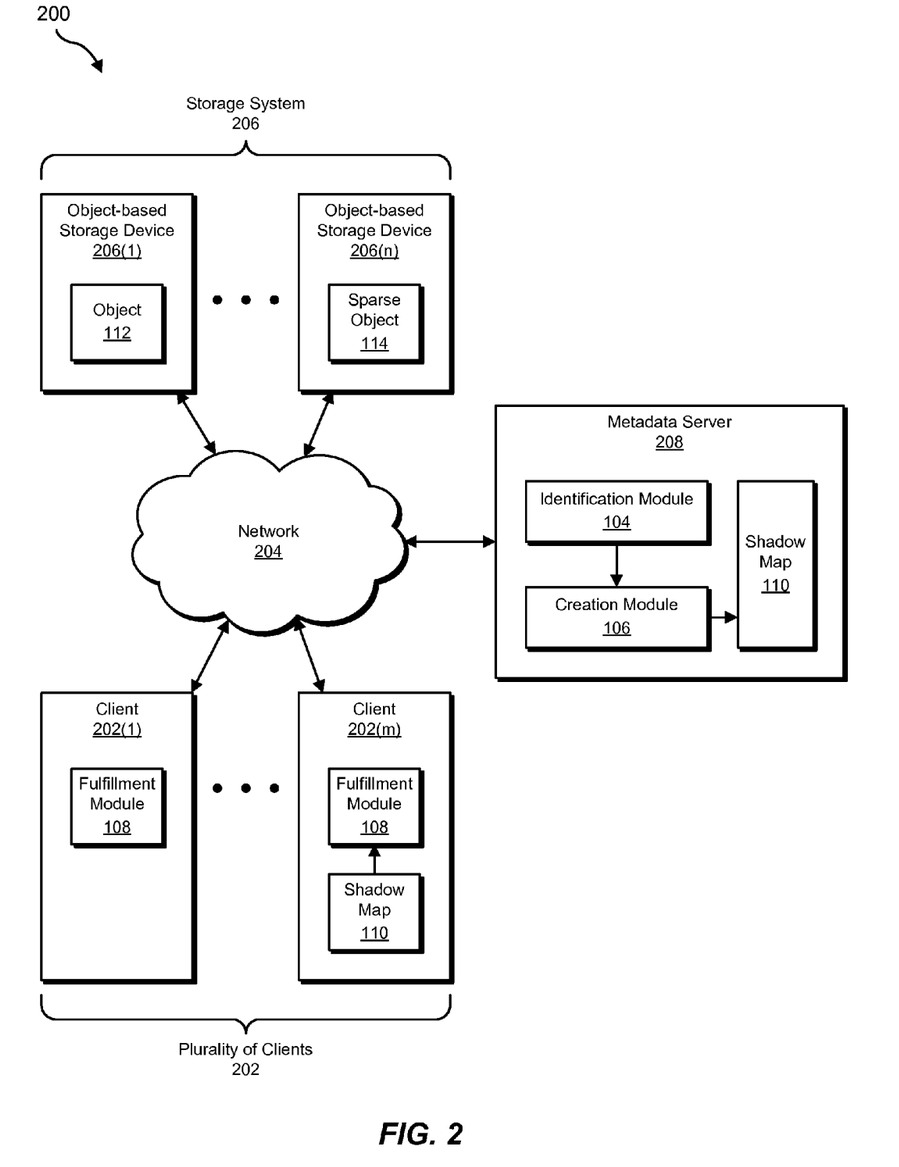
FIG. 2 is a block diagram of an exemplary system for hotspot mitigation in object-based file systems.
Figure 3:
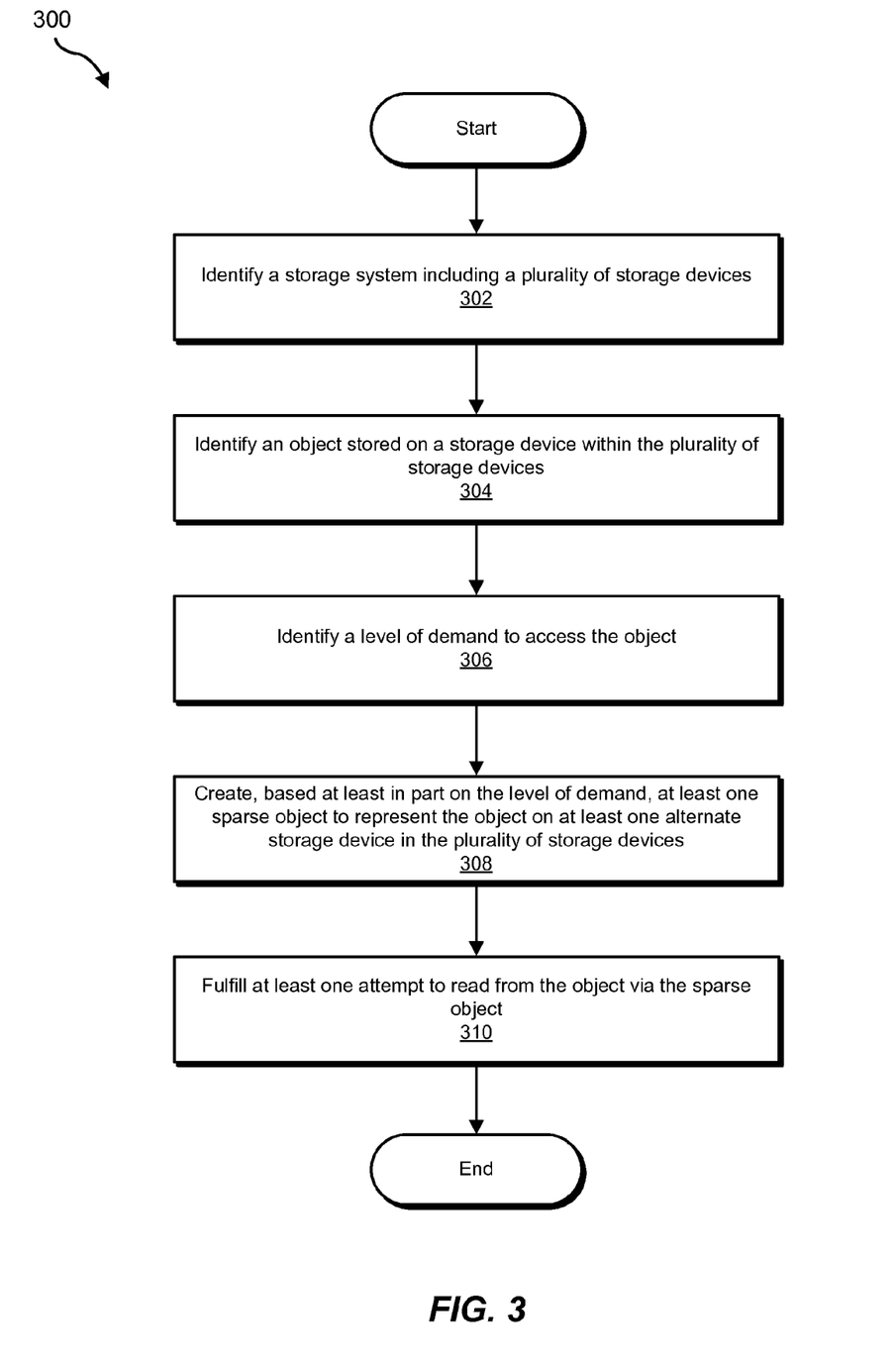
FIG. 3 is a flow diagram of an exemplary method for hotspot mitigation in object-based file systems.
Figure 4:
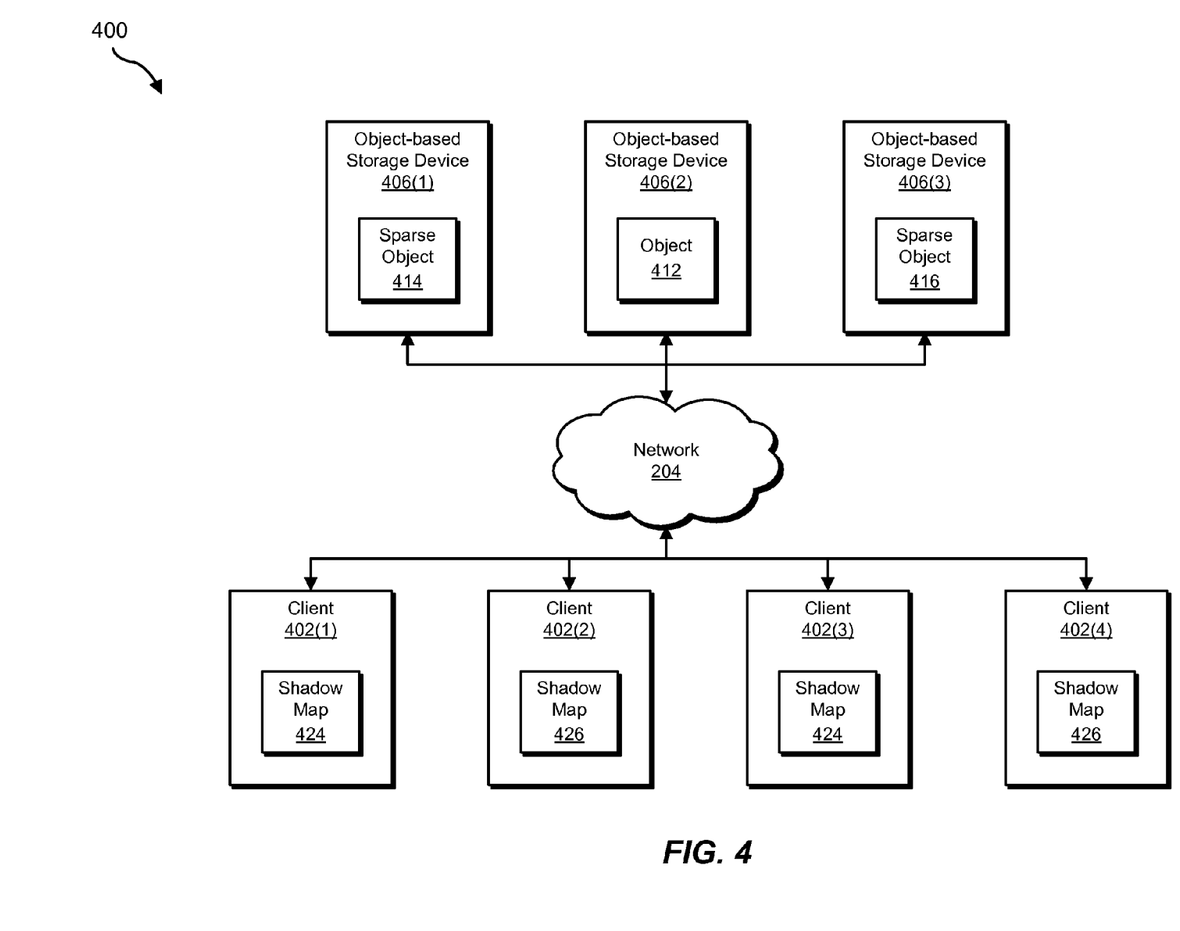
FIG. 4 is a block diagram of an exemplary system for hotspot mitigation in object-based file systems.

The following will provide, with reference to FIGS. 1, 2, and 4, detailed descriptions of exemplary systems for hotspot mitigation in object-based file systems. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for hotspot mitigation in object-based file systems. As illustrated in this figure, exemplary system 100 may include one or more modules 102 for performing one or more tasks. For example, and as will be explained in greater detail below, exemplary system 100 may include an identification module 104 programmed to identify 1) a storage system including a plurality of storage devices, 2) an object stored on a storage device within the plurality of storage devices, and 3) a level of demand to access the object. Exemplary system 100 may also include a creation module 106 programmed to create, based at least in part on the level of demand, at least one sparse object to represent the object on at least one alternate storage device in the plurality of storage devices.

In addition, and as will be described in greater detail below, exemplary system 100 may include a fulfillment module 108 programmed to fulfill at least one attempt to read from the object via the sparse object. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., clients 202, storage system 206, and/or metadata server 208), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing or network-based environments may provide various services and applications via the Internet. These cloud-based or network-based services (e.g., software as a service, platform as a service, infrastructure as a service, etc.) may be accessible through a web browser or other remote interface. Various functions described herein may be provided through a remote desktop environment or any other cloud-based or network-based computing environment.

As shown in FIG. 2, system 200 may include a plurality of clients 202 in communication with a storage system 206 and a metadata server 208 via a network 204. In one embodiment, and as will be described in greater detail below, metadata server 208 may include identification module 104 and creation module 106, while clients 202 may include fulfillment module 108.

In one example, and as will be described in greater detail below, modules 102 may program metadata server 208 and/or clients 202 to 1) identify a storage system including a plurality of storage devices (e.g., storage system 206), 2) identify an object stored on a storage device within the plurality of storage devices (e.g., an object 112 on an object-based storage device 206(1)), 3) identify a level of demand to access the object (e.g., object 112), 4) create, based at least in part on the level of demand, at least one sparse object (e.g., a sparse object 114) to represent the object on at least one alternate storage device in the plurality of storage devices (e.g., an object-based storage device 206(n), and 5) fulfill at least one read attempt to read from the object via the sparse object (e.g., fulfill an attempt to read object 112 via sparse object 114).

Clients 202 generally represent any type or form of computing device capable of reading computer-executable instructions. Examples of clients 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Storage system 206 generally represents any type or form of storage, including object-based storage, clustered storage, and/or distributed storage. Object-based storage devices 206(1)-(n) may include any suitable storage device, such as hard disk drives, solid-state drives, etc.

Metadata server 208 generally represents any type or form of computing device that is capable of managing and/or providing metadata for an object-based, clustered, and/or distributed storage system. Examples of metadata server 208 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between clients 202, storage system 206, and metadata server 208.

FIG. 3 is a flow diagram of an exemplary computer-implemented method 300 for hotspot mitigation in object-based file systems. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a storage system including a plurality of storage devices. For example, at step 302 identification module 104 may, as part of one or more of clients 202 in FIG. 2, identify storage system 206.

Identification module 104 may perform step 302 in any suitable manner. For example, identification module 104 may identify the storage system by reading from a configuration file identifying the storage system. Additionally or alternatively, identification module 104 may identify the storage system by receiving a communication from the storage system.

In some examples, the storage system may include an object-based storage system. As used herein, the phrase "object-based storage" may refer to any manner of storage in which file data is striped across one or more objects. In some examples, these objects may be stored in various locations in a cluster of storage devices. Examples of object-based storage systems include, but are not limited to, storage systems using SYMANTEC FILESTORE OFS and/or using PNFS. As will be explained in greater detail below, the placement of these objects within the storage cluster may depend on a placement algorithm.

The storage system may also include a storage system connected to a plurality of clients. For example, multiple clients may have and/or require access to the storage system and/or any given object within the storage system. Accordingly, these clients may create hotspots when attempting to access one or more objects on the same storage device within the storage system at the same time.

At step 304, the systems described herein may identify an object stored on a storage device within the plurality of storage devices. For example, at step 304 identification module 104 may, as part of one or more of clients 202 in FIG. 2, identify object 112 stored on object-based storage device 206(1). As another example, FIG. 4 illustrates an exemplary system 400 for hotspot mitigation in object-based file systems. In this example, identification module 104 may identify an object 412 stored on an object-based storage device 406 (2).

Identification module 104 may identify the object in any suitable manner. For example, identification module 104 may identify a file under demand from multiple clients. Identification module 104 may then identify the object as a part of the file. Additionally or alternatively, identification module 104 may identify the object by 1) identifying the storage device based at least in part on an indicator of load on the storage device and 2) identifying a portion of the load on the storage device that relates to the object. In this example, identification module 104 may determine that the storage device is a hotspot (e.g., by monitoring traffic to and/or from the storage device, by receiving a communication from the storage device, by receiving a communication from a client that is waiting for a response from the storage device or has received an error from the storage device, etc.). Identification module 104 may then determine that some portion of the load on the storage device is due to the object.

Returning to FIG. 3, at step 306 one or more of the systems described herein may identify a level of demand to access the object. For example, at step 306 identification module 104 may, as part of one or more of clients 202 in FIG. 2, identify a level of demand to access object 112. Using FIG. 4 as another example, identification module 104 may identify a level of demand to access object 412.

Identification module 104 may examine a variety of information to determine the level of demand. For example, identification module 104 may identify 1) a number of clients attempting to read from the object (e.g., by monitoring network traffic, by receiving one or more communications from the plurality of clients, by receiving a communication from the storage device, etc.), 2) a projected number of clients attempting to read from the object (e.g., by receiving a communication from one or more clients and/or applications running on the clients, by imputing current demand for an object in a file to future demand for other objects in the file, etc.), 3) an indicator of load on the storage device (e.g., by receiving a communication from the storage device, by receiving a communication from a client attempting to communicate with the storage device, etc.), and/or 4) a performance indicator of the storage device.

In some examples, identification module 104 may identify the level of demand by determining that the indicators of demand meet a certain criterion or reach a predetermined threshold. For example, identification module 104 may determine that the level of demand is "high" simply by identifying the object as described in step 304.

Returning to FIG. 3, at step 308 one or more of the systems described herein may create, based at least in part on the level of demand, at least one sparse object to represent the object on at least one alternate storage device in the plurality of storage devices. For example, at step 308 creation module 106 may, as part of one or more of clients 202 in FIG. 2, create sparse object 114. Using FIG. 4 as another example, creation module 106 may create sparse objects 414 and 416. As used herein, the term "sparse object" may refer to any object that is populated on a just-in-time basis (e.g., in response to an attempt to read the sparse object).

In some examples, creation module 106 may create the sparse object by generating a map that locates the object at a location of the sparse object. Using FIG. 2 as an example, clients 202 may receive a default map locating objects within storage system 206. For example, if client 202(1) requires access to object 112, metadata server 208 may send a default map to client 202(1) with a layout of any corresponding regions. However, creation module 106 may create sparse object 114 by generating a shadow map 110 and serving the shadow map to client 202(m). Client 202(m) may then locate object 112 at sparse object 114 on an object-based storage device 206(n).

In some examples, the map may include a result of a distribution function for placing data within the storage system. For example, the map may include the result of a Controlled Replication Under Scalable Hashing ("CRUSH") algorithm. While the default map mentioned in the example above may use a traditional CRUSH algorithm, the map for the sparse object (a "shadow map") may use a modified CRUSH algorithm. While a traditional CRUSH algorithm may map an object onto a list of storage devices, the modified CRUSH algorithm may accept an additional input. For each sparse object required, creation module 106 may use a unique additional input to the modified CRUSH algorithm in order to generate a unique shadow map placing a sparse object in a unique location. In this manner, creation module 106 may identify a load factor number m for an object. Creation module 106 may then generate maps for the object using numbers from 1 to m as an additional input to the modified CRUSH algorithm. This may result in m maps for m sparse objects.

Using FIG. 4 as an example, object 412 may have such a load as to require two sparse objects. Creation module 106 may accordingly create two shadow maps: a shadow map 424 and a shadow map 426. Shadow map 424 may map to a sparse object 414 instead of object 412, and shadow map 426 may map to a sparse object 416 instead of object 412.

In some examples, creation module 106 may create the map only for the object or a list of objects to which the object belongs. In these examples, a client may use a default map for all reads except for the object or list of objects.

Returning to FIG. 3, at step 310 one or more of the systems described herein may fulfill at least one attempt to read from the object via the sparse object. For example, at step 310 fulfillment module 108 may, as part of one or more of clients 202 in FIG. 2, fulfill an attempt by client 202(m) to read from object 112 via sparse object 114. Using FIG. 4 as another example, fulfillment module 108 may fulfill an attempt by a client 402(3) to read from object 412 via sparse object 414.

Fulfillment module 108 may perform step 310 in any suitable manner. For example, fulfillment module 108 may use a map that locates the object at the location of the sparse object. Using FIG. 4 as an example, fulfillment module 108 may use shadow map 424 for reads of object 412 from clients 402(1) and 402(3), resulting in reads via sparse object 414. Likewise, fulfillment module 108 may use shadow map 426 for reads of object 412 from clients 402(2) and 402(4), resulting in reads via sparse object 416.

In some examples, the sparse object—or a portion thereof—may yet be unpopulated when fulfillment module 108 accesses the sparse object. In these examples, fulfillment module 108 (e.g., as part of the storage device) may fetch data corresponding to the object. For example, if client 402(1) attempts to read from sparse object 414 when sparse object 414 has not yet been populated, sparse object 414 may (via, e.g., fulfillment module 108 and/or storage device 406(1)) fetch some or all of object 412 as necessary to fulfill the read request via sparse object 414. Fulfillment module 108 may then populate the sparse object with the data. In this manner, future read attempts may result in a successful read without accessing the original object. This may, in turn, reduce the load on the original object, thereby alleviating the storage device as a hotspot.

In some examples, the systems described herein may also deprecate the sparse object based at least in part on a reduction of the level of demand to access the object. For example, once the load on the object has reduced, a metadata server may discontinue a shadow map. Clients that formerly used the shadow map may use the original map for the object going forward. In cases in which POSIX semantics are implemented in the input/output of the storage system, deprecating the sparse object may additionally include invalidating all shadow maps and discarding data in sparse objects. In cases in which locking modes are available, appending writes may allow the preservation of sparse objects. For example, a writing client may take a "Grow mode" lock (e.g., as implemented in SYMANTEC FILESTORE OFS) and object storage devices with sparse objects may take a "Shared2 mode" lock (e.g., as implemented in SYMANTEC FILESTORE OFS).

As explained above, the systems and methods described herein may dynamically create sparse objects in an attempt to mitigate hotspots. Furthermore, by using deterministically generated placement maps for sparse objects, these systems and methods may dynamically vary the number of sparse objects based on input/output load and quickly diffuse the load on files at identified hotspots within minimal initial overhead. Additionally, the systems and methods described herein may easily recover from failures simply by failing back to the original object or using a new map pointing to a new sparse object.

Figure 5:
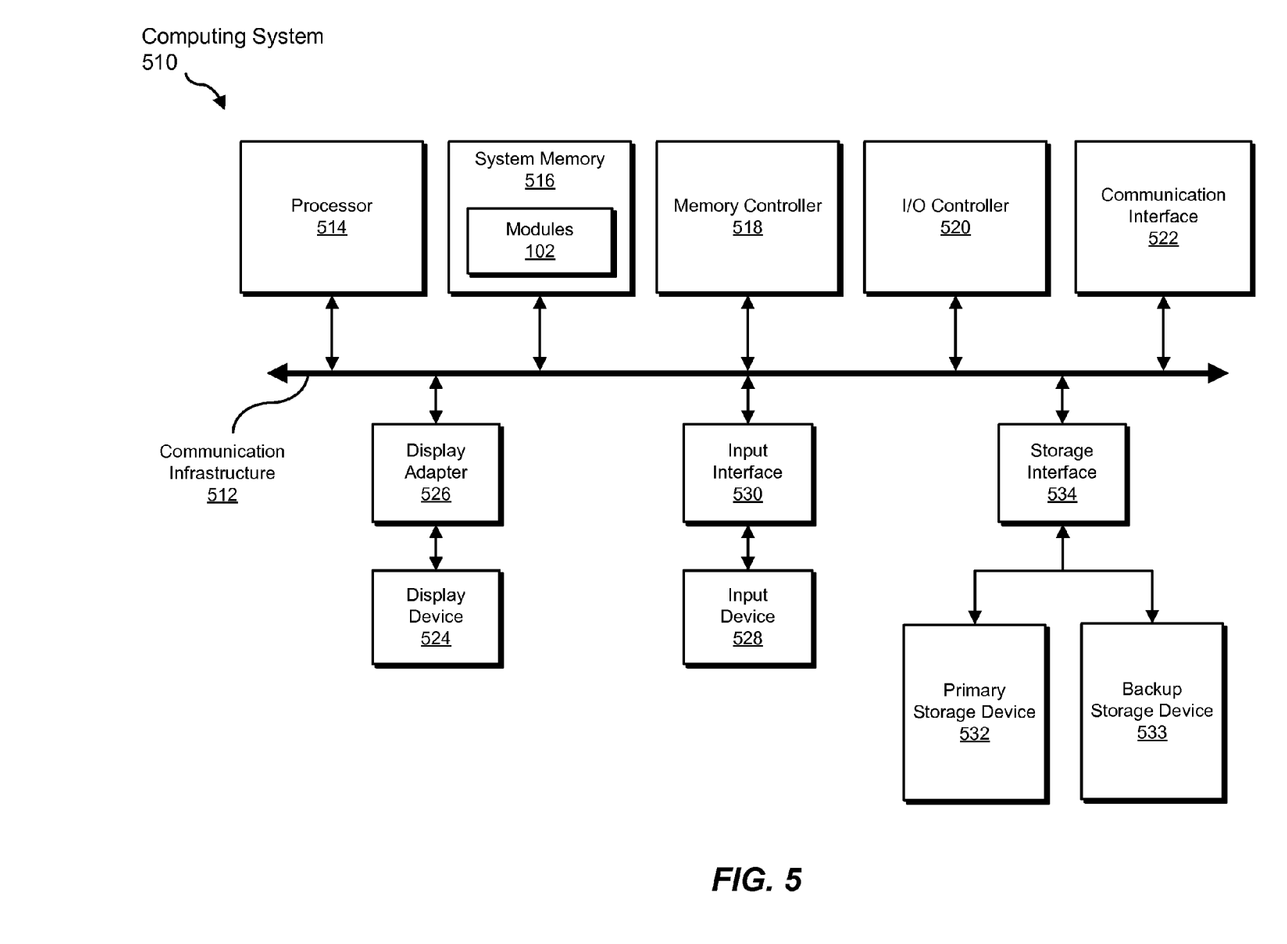
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, creating, generating, fulfilling, using, fetching, populating, and/or deprecating steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, creating, generating, fulfilling, using, fetching, populating, and/or deprecating.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, creating, generating, fulfilling, using, fetching, populating, and/or deprecating steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, creating, generating, fulfilling, using, fetching, populating, and/or deprecating steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, creating, generating, fulfilling, using, fetching, populating, and/or deprecating steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, creating, generating, fulfilling, using, fetching, populating, and/or deprecating steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
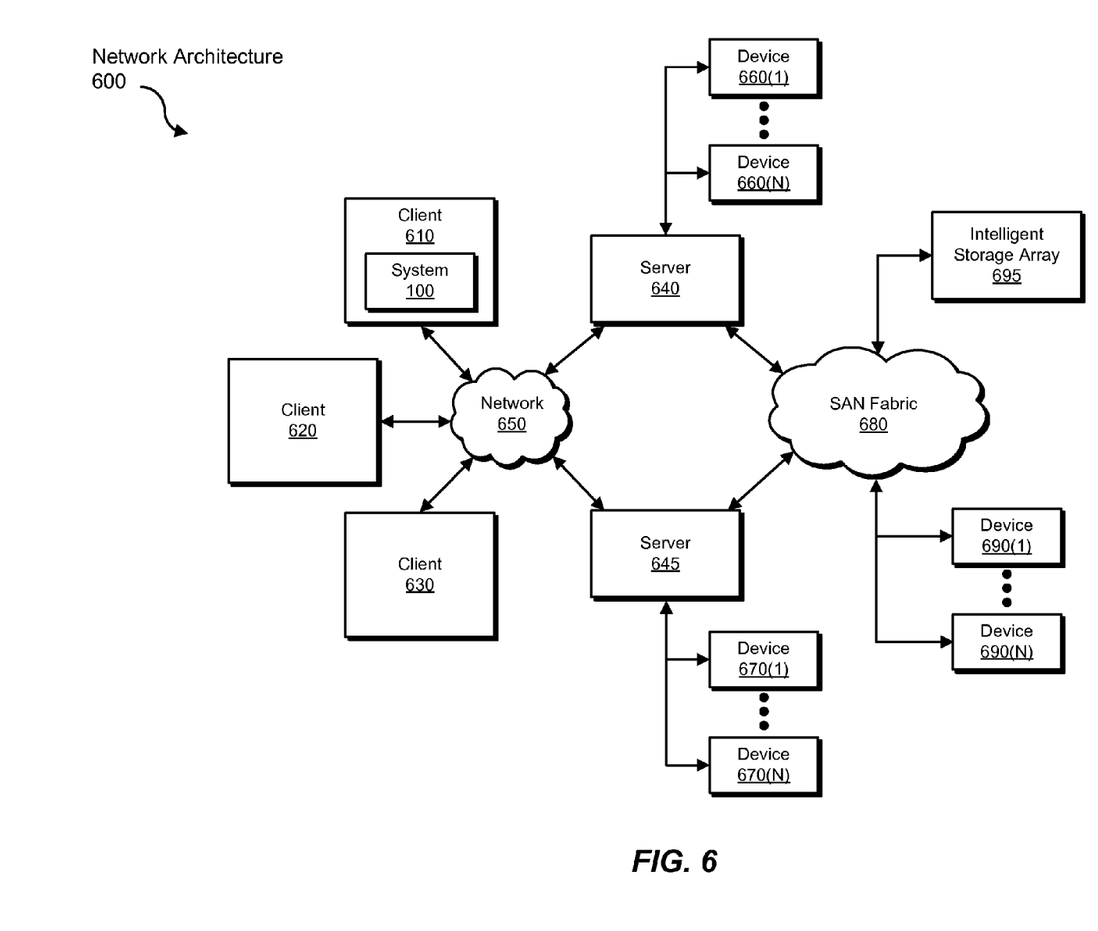
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, creating, generating, fulfilling, using, fetching, populating, and/or deprecating steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for hotspot mitigation in object-based file systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform an object-based storage system into an efficient object-based storage system capable of dynamically mitigating hotspots.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for hotspot mitigation in object-based file systems, at least a portion of the method being performed by a computing device comprising at least one processor, the method comprising:

identifying a storage system comprising a plurality of storage devices;

identifying an object stored on a storage device within the plurality of storage devices;

identifying a level of demand to access the object;

creating, based at least in part on the level of demand, a number of sparse object to represent the object on at least one alternate storage device in the plurality of storage devices, wherein each sparse object is populated with data corresponding to the object on a just-in-time basis in response to a read request;

for each sparse object, generating a unique shadow map that locates the object at a unique location of the sparse object;

fulfilling at least one attempt by a client to read from the object by serving one of the unique shadow maps to the client resulting in reading the object via one of the number of sparse objects.

2. The computer-implemented method of claim 1, wherein the storage system comprises an object-based storage system in which file data is striped across one or more objects, the one or more objects comprising the object stored on the storage device.

3. The computer-implemented method of claim 1, wherein the number of sparse objects created is based on an input/output load of the storage system.

4. The computer-implemented method of claim 1, wherein:
the client is served with a default map that uses a CRUSH algorithm;
each unique shadow map uses a modified CRUSH algorithm that accepts an additional input.

5. The computer-implemented method of claim 1, wherein each shadow map comprises a result of a distribution function for placing data within the storage system.

6. The computer-implemented method of claim 1, wherein:
the sparse object used by the client to read from the object is yet unpopulated when the client attempts to read from the object;
fulfilling the attempt by the client to read from the object further comprises:
fetching the data corresponding to the object;
populating the sparse object with the data.

7. The computer-implemented method of claim 1, wherein identifying the level of demand to access the object comprises identifying at least one of:
a number of clients attempting to read from the object;
a projected number of clients attempting to read from the object;
an indicator of load on the storage device;
a performance indicator of the storage device.

8. The computer-implemented method of claim 1, wherein identifying the object stored on the storage device comprises:
identifying the storage device based at least in part on an indicator of load on the storage device;
identifying a portion of the load on the storage device that relates to the object.

9. The computer-implemented method of claim 1, wherein the storage system comprises a storage system connected to a plurality of clients.

10. The computer-implemented method of claim 1, further comprising deprecating one of the number of sparse objects based at least in part on a reduction of the level of demand to access the object.

11. A system for hotspot mitigation in object-based file systems, the system comprising:
an identification module programmed to:
identify a storage system comprising a plurality of storage devices;
identify an object stored on a storage device within the plurality of storage devices;
identify a level of demand to access the object;
a creation module programmed to:
create, based at least in part on the level of demand, a number of sparse object to represent the object on at one alternate storage device in the plurality of storage devices, wherein each sparse object is populated with data corresponding to the object on a just-in-time basis in response to a read request;

generate, for each sparse object, a unique shadow map that locates the object at a unique location of the sparse object;

a fulfillment module programmed to fulfill at least one attempt by a client to read from the object by serving one of the unique shadow maps to the client resulting in reading the object via one of the number of sparse objects;

at least one processor configured to execute the identification module, the creation module, and the fulfillment module.

12. The system of claim 11, wherein the storage system comprises an object-based storage system in which file data is striped across one or more objects, the one or more objects comprising the object stored on the storage device.

13. The system of claim 11, wherein the creation module is programmed to specify the number of sparse objects created based on an input/output load of the storage system.

14. The system of claim 11, wherein:
the fulfillment module is programmed to serve the client with a default map that uses a CRUSH algorithm;
the creation module is programmed to create each unique shadow map using a modified CRUSH algorithm that accepts an additional input.

15. The system of claim 11, wherein each shadow map comprises a result of a distribution function for placing data within the storage system.

16. The system of claim 11, wherein:
the sparse object used by the client to read from the object is yet unpopulated when the client attempts to read from the object;
the fulfillment module is programmed to fulfill the attempt by the client to read from the object by:
fetching the data corresponding to the object;
populating the sparse object with the data.

17. The system of claim 11, wherein the identification module is programmed to identify the level of demand to access the object by identifying at least one of:
a number of clients attempting to read from the object;
a projected number of clients attempting to read from the object;
an indicator of load on the storage device;
a performance indicator of the storage device.

18. The system of claim 11, wherein the identification module is programmed to identify the object stored on the storage device by:
identifying the storage device based at least in part on an indicator of load on the storage device;
identifying a portion of the load on the storage device that relates to the object.

19. The system of claim 11, wherein the storage system comprises a storage system connected to a plurality of clients.

20. A non-transitory computer-readable-storage medium comprising one or more computer-executable instructions that, when executed by at least one processor of a computing device, cause the computing device to:
identify a storage system comprising a plurality of storage devices;
identify an object stored on a storage device within the plurality of storage devices;
identify a level of demand to access the object;
create, based at least in part on the level of demand, a number of sparse objects to represent the object on at least one alternate storage device in the plurality of storage devices, wherein each sparse object is populated with data corresponding to the object on a just-in-time basis in response to a read request;

generate, for each sparse object, a unique shadow map that locates the object at a unique location of the sparse object;

fulfill at least one attempt by a client to read from the object by serving one of the unique shadow maps to the client resulting in reading the object via one of the number of sparse objects.

* * * * *

UNITED STATES PATENT AND TRADEMARK OFFICE
CERTIFICATE OF CORRECTION

| | | |
|---|---|---|
| PATENT NO. | : 8,965,855 B1 | Page 1 of 1 |
| APPLICATION NO. | : 12/857018 | |
| DATED | : February 24, 2015 | |
| INVENTOR(S) | : Amit Phansalkar | |

It is certified that error appears in the above-identified patent and that said Letters Patent is hereby corrected as shown below:

In the Claims

Claim 1, at column 12, line 67, should read:
number of sparse objects to represent the object on at least Claim 11, at column 13, line 67, should read:
number of sparse objects to represent the object on at least Signed and Sealed this
Seventeenth Day of May, 2016

Michelle K. Lee
*Director of the United States Patent and Trademark Office*